United States Patent [19]

Kerko et al.

[11] Patent Number: 5,607,493
[45] Date of Patent: Mar. 4, 1997

[54] METHOD OF MAKING NON-PHOTOCHROMIC OPTICAL FILTER GLASSES

[75] Inventors: David J. Kerko; Brent M. Wedding, both of Corning, N.Y.

[73] Assignee: Corning Incorporated, Corning, N.Y.

[21] Appl. No.: 554,064

[22] Filed: Nov. 6, 1995

Related U.S. Application Data

[62] Division of Ser. No. 376,797, Jan. 23, 1995, Pat. No. 5,491,117.

[51] Int. Cl.$^6$ .................................. C03C 15/00
[52] U.S. Cl. .................. 65/30.1; 65/30.12; 65/32.1; 65/32.4
[58] Field of Search .................. 65/30.1, 30.12, 65/32.1, 32.4, 111

[56] References Cited

U.S. PATENT DOCUMENTS

| | | | |
|---|---|---|---|
| 3,208,860 | 9/1965 | Armistead et al. | 106/54 |
| 3,892,582 | 7/1975 | Simms | 106/52 |
| 3,920,463 | 11/1975 | Simms | 106/54 |
| 4,190,451 | 2/1980 | Hares et al. | 106/47 |
| 4,240,836 | 12/1980 | Borrelli et al. | 106/47 |
| 4,290,794 | 9/1981 | Wedding | 65/30.11 |
| 4,537,612 | 8/1985 | Borrelli et al. | 65/30.11 |
| 4,710,430 | 12/1987 | Borrelli et al. | 428/432 |
| 4,832,724 | 5/1989 | Borrelli et al. | 65/30.11 |
| 4,840,655 | 6/1989 | Borrelli et al. | 65/30.11 |
| 5,381,193 | 1/1995 | Wedding | 351/163 |
| 5,534,041 | 7/1996 | Havens et al. | 65/30.1 |

OTHER PUBLICATIONS

Document Number 08/334,929, Date Jul. 9, 1996, Havens et al., filed Nov. 7, 1994.

*Primary Examiner*—Donald E. Czaja
*Assistant Examiner*—Michael Philip Colaianni
*Attorney, Agent, or Firm*—Milton M. Peterson

[57] ABSTRACT

This invention is directed to the production of a silver halide-containing glass article essentially free from silver halide crystals exhibiting a bright yellow coloration which strongly attenuates the transmission of ultraviolet radiation and radiation having a wavelength up to about 450 nm, said article having an integral reduced surface layer thereon, the depth of that layer being sufficient to effectively prevent the transmission therethrough of ultraviolet radiation and radiation having a wavelength up to about 450 nm.

4 Claims, 1 Drawing Sheet

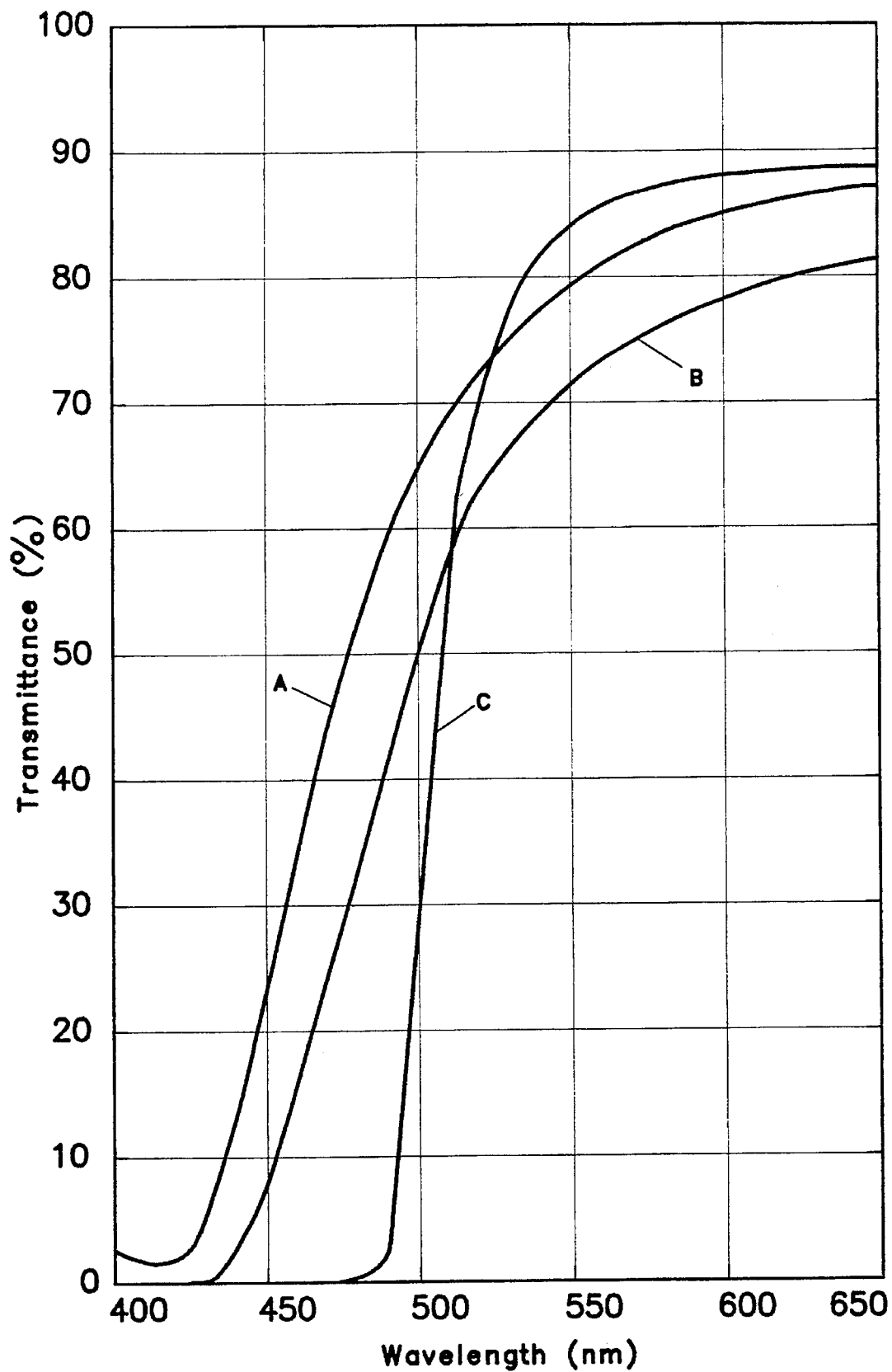

METHOD OF MAKING NON-PHOTOCHROMIC OPTICAL FILTER GLASSES

This is a division of application Ser. No. 08/376,797, filed Jan. 23, 1995, U.S. Pat. No. 5,491,117.

FIELD OF THE INVENTION

The field of the present invention is the production of optical filter glasses which strongly attenuate ultraviolet radiation and visible radiations in the violet and blue regions of the spectrums. Such glasses exhibit a strong yellow coloration.

BACKGROUND OF THE INVENTION

Glasses designed to attenuate the ultraviolet, violet, and blue regions of the electromagnetic spectrum have been commercially available for many years. Such glasses have generally contained microcrystals of cadmium sulfoselenides to filter out those regions. There are several features intrinsic to those glasses, however, which lessen their suitability for certain applications. To illustrate:

First, if the heat treatment to which the glasses are necessarily exposed to develop the microcrystals therewithin is not properly performed, the crystals grow to a size large enough to cause objectional scattering of visible light passing therethrough, thereby resulting in the development of haze in the glass.

Second, exposure of those glasses to ultraviolet radiation produces a bright visible light fluorescence, thereby creating unwanted optical noise.

Third, the absorption character of the cadmium sulfoselenide crystals changes rapidly with variations in temperature. For example, heating those glasses reduces the amount of visible radiation that is transmitted therethrough.

Fourth, all radiation having wavelengths shorter than the filter cutoff is very strongly attenuated. In certain applications it can be desirable to permit a small amount of short wave blue light to pass therethrough in order to improve the overall color rendition; that is, to make the colors viewed through the glass more "real". The ability to achieve that property is extremely difficult to achieve by varying the concentrations of the cadmium sulfoselenide colorants.

Fifth, it is desirable to avoid use of cadmium because of its toxic nature.

The virtual elimination of those undesirable features, while simultaneously developing a fixed color or tint therein without the inclusion of conventional glass colorants, has been accomplished in commercially marketed, silver halide crystal-containing, photochromic glasses. Thus, by subjecting a silver halide crystal-containing photochromic glass to a defined thermochemical treatment, a constant permanent color can be produced in an integral surface layer thereon.

The presence of microcrystals of the silver halides AgCl, AgBr, and/or AgI effects the reversible darkening displayed by a photochromic glass when sequentially exposed and removed from exposure to actinic radiation, such radiation customarily consisting of ultraviolet radiation. U.S. Pat. No. 3,208,860 (Armistead et al.) furnishes the fundamental explanation of the photochromic phenomenon demonstrated by glasses containing microcrystals of a silver halide. U.S. Pat. No. 4,190,451 (Hares et al.) discloses more recently developed photochromic glass compositions containing silver halide crystals which exhibit rapid darkening and fading characteristics.

U.S. Pat. Nos. 3,892,582 and 3,920,463 (Simms) provide examples of thermal reduction heat treatments operable in developing integral yellow surface layers in silver halide crystal-containing photochromic glasses, while U.S. Pat. No. 4,240,836 (Borrelli et al.) discloses a modified thermal reduction heat treatment of photochromic glasses of similar base compositions which enables the development of a broader range of colors therein.

The method disclosed in the last patent comprises subjecting the photochromic glasses to a heat treatment at a temperature not exceeding about 450° C. for a time sufficient to generate certain visible light absorption characteristics in an integral surface layer in the article. The light absorption characteristics developed as a result of the thermoreduction heat treatment are such that the glass, in the undarkened state, demonstrates a spectral transmittance curve comprising at least one treatment-induced absorption peak having a location and an intensity such that the peak falls within the transmittance region to the right of line CB in FIG. 1 of the drawings. The peak is not present in the parent photochromic glass from which the surface-colored article is produced. Consequently, in the surface colored glass article the color in the surface layer differs from the color of the bulk glass, which condition can be readily determined by comparing the spectral transmittance characteristics of the article before and after the removal of a small amount of the surface layer therefrom.

The mechanism underlying the development of the surface coloring effects was theorized as being caused by the chemical reduction of silver in contact with silver halide microcrystals in a region very close to the surface of the glass article, with the identity of the color being determined by the geometric form and arrangement of metallic silver on those microcrystals. That theory was confirmed by means of experiments demonstrating that, when a specific thermal reduction treatment was applied to a photochromic glass, the glass displayed a variety of absorption peaks depending upon the process initially employed to generate the silver halide microcrystals in the glass.

Other patents disclosing methods for imparting and/or modifying integral colored surface layers in photochromic glasses containing silver halide crystals include U.S. Pat. No. 4,290,794 (Wedding), U.S. Pat. No. 4,537,612 (Borrelli et al.), U.S. Pat. No. 4,710,430 (Borrelli et al.), U.S. Pat. No. 4,832,724 (Borrelli et al.) and U.S. Pat. No. 4,840,655 (Borrelli et al.)

U.S. Pat. No. 5,381,193 (Wedding) is directed to the production of silver halide crystal-containing photochromic glasses wherein radiations having wavelengths shorter than about 550 nm are substantially attenuated, but which are designed to permit a small blue transmission so as to reduce distortion of color perception. The method for preparing such glasses involved subjecting the photochromic glasses to a specifically-defined time-temperature treatment in the range of 2–12 hours at a temperature in the range of 320°–550° C.

U.S. application Ser. No. 08/334,929, filed Nov. 7, 1994 by T. B. Havens et al. under the title LASER EYEWEAR PROTECTION, describes the production of silver halide crystal-containing glass articles which are essentially opaque to ultraviolet radiation and, optionally, may be opaque to radiation having wavelengths up to 550 nm. The method comprises subjecting silver halide crystal-containing glass articles which exhibit photochromic behavior to a hydrogen-containing atmosphere at a temperature between 375°–500° C. for a period of at least four hours to produce an integral reduced layer on the article having a sufficient depth to effectively prevent the transmission of ultraviolet radiation therethrough and, optionally, to prevent the transmission of radiation having a wavelength up to 550 nm. The application noted that the final article did not exhibit photochromic behavior. Hence, whereas the starting glass article exhibited photochromism, because the integral surface layer developed thereon blocks the passage of ultraviolet radiation there is no transmission of the actinic radiation necessary to react with the silver halide crystals to cause the glass to darken.

Whereas photochromic behavior can be effected in silver halide-containing glass articles as such are being cooled from a glass melt, that procedure does not permit careful control of time and temperature. Accordingly, the essentially universal practice for producing photochromic glass articles is to form a glass article of a desired configuration from a melt (frequently annealed), and thereafter to subject the article to a selected time-temperature heat treatment to cause the in situ growth of silver halide microcrystals. The temperatures of those heat treatments range from about 100° C. above the annealing point of the glass up to about the softening point thereof for times ranging from several minutes to several hours, depending upon the temperature employed, shorter times being operable at higher temperatures.

As can be appreciated, that heat treatment process to develop silver halide microcrystals adds cost to the product. Moreover, in like manner to the filter glasses disclosed in Ser. No. 08/334,929, supra, there are applications wherein photochromic behavior is not needed and may even be undesirable. Therefore, whereas it is possible to prepare filter glasses designed to attenuate ultraviolet, violet, and blue regions of the radiation spectrum with or without a small blue transmission by means of the thermoreduction of silver halide crystal-containing photochromic glasses, such glasses have restricted applicability. For example, filter glasses are frequently employed in the fields of optometry and ophthalmology where the property of photochromism is undesirable and total attenuation of ultraviolet radiation is not required.

It was explained above that glasses operable for filtering the ultraviolet, violet, and blue regions of the radiation spectrum are commercially available. Because, however, those glasses have generally relied upon the presence of cadmium sulfoselenide crystals, they are subject to a number of undesirable features.

Accordingly, the principal objective of the present invention was to devise a method/glass composition operable to produce glasses which strongly attenuate radiations in the ultraviolet, violet, and blue regions of the spectrum, but which glasses would not exhibit photochromic behavior or contain cadmium sulfoselenide or other crystal phases rendering them subject to the undesirable features exhibited by glasses containing cadmium sulfoselenide crystals.

SUMMARY OF THE INVENTION

The present invention is founded upon the thermoreduction of a narrow interval of silver halide-containing glass compositions which, if heat treated properly, would witness the in situ generation of silver halide microcrystals with the consequent development of photochromic behavior. More specifically, the instant invention comprises exposing a glass article having a composition coming within the ranges described in U.S. Pat. No. 4,190,451, supra, to a controlled heat treating in a hydrogen-containing atmosphere.

The glass compositions disclosed in that patent consist essentially, expressed in terms of weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges about 0.55–0.85, and the weight ratio Ag:(Cl+Br) ranges about 0.65–0.95. The patent further observed the optional presence of up to 10% total of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F. U.S. Pat. No. 4,190,451 is expressly incorporated herein by reference.

As employed herein, the expression "consisting essentially of" means that no substantial amounts of unspecified ingredients can be included which materially affect the fundamental characteristics of the composition. The expression, however, does not exclude the presence of materials in impurity amounts.

The inventive method comprises exposing a glass article having a composition coming within the above-recited intervals to a hydrogen-containing atmosphere in a heat treating chamber operating at a temperature between about 450°–500° C. for a period of time sufficient (generally at least about 0.5 hour) to produce an integral reduced surface layer having a depth effective to strongly attenuate the transmission of ultraviolet radiation and radiation having a wavelength up to about 450 nm through the article, to thereby result in a surface layer exhibiting a bright yellow coloration. Somewhat lower temperatures may be effective, but require an undesirably long treatment time and provide no substantial advantage. The expression "strongly attenuate" as utilized here means that the transmission of radiation does not exceed about 20%. The article is transparent to visible radiation having wavelengths longer than the region of attenuated transmission.

The temperature interval of 450°–500° C. enables the reduced surface layer to develop rapidly, but is sufficiently low to avoid thermal distortion of the glass article. The depth of the surface layer increases more rapidly as the heat treating temperature increases. In contrast to photochromic glasses of identical composition, in which glasses the spectral absorption of the reduced surface layer is known to demonstrate great color changes with variations in firing temperatures, the absorption band shape in the inventive non-photochromic articles is not strongly affected by changes in firing temperature.

The mechanism underlying the yellow surface coloration has not been fully elucidated. Hence, because there are essentially no microcrystals of silver halide in the inventive glass articles, the coloring mechanism theorized in U.S. Pat. No. 4,240,836, supra, is not applicable. As used here, the expression "essentially no" means that no effort was consciously made by applying a heat treatment to the article to in situ develop such crystals. Therefore, the only crystals present, if any, would have been inadvertently generated. Because the color produced in the surface layer of the inventive articles is not strongly affected by changes in firing temperature (unlike the colorations produced when silver halide microcrystals are present and metallic silver is precipitated on those microcrystals), it is posited that the yellow coloration results from the reduction of silver ions to metallic silver.

BRIEF DESCRIPTION OF THE DRAWING

FIG. 1 constitutes a graph plotting transmittance vs. radiation wavelength. The abscissa records wavelengths in terms of nm and the ordinate records transmittances in terms of percent.

PRIOR ART

The patents discussed earlier are believed to comprise the most pertinent prior art.

DESCRIPTION OF PREFERRED EMBODIMENTS

Corning Code 8112 glass, marketed commercially by Corning Incorporated, Corning, N.Y., for fashioning ophthalmic eyewear, has a composition coming within the ranges disclosed in U.S. Pat. No. 4,190,451, supra. The glass has the following composition, expressed in terms of parts by weight. Nevertheless, inasmuch as the sum of the individual components closely approximates 100, for all practical purposes each of the recorded values may be considered to represent weight percent.

| $SiO_2$ | 55.8 | $Na_2O$ | 4.0 | Ag | 0.24 |
|---|---|---|---|---|---|
| $Al_2O_3$ | 6.5 | $K_2O$ | 5.8 | Cl | 0.20 |
| $B_2O_3$ | 18.0 | $ZrO_2$ | 4.9 | Br | 0.13 |
| $Li_2O$ | 1.9 | $TiO_2$ | 2.2 | CuO | 0.011 |

Because Corning Code 8112 glass is commercially marketed such that articles fashioned therefrom are readily available, the following examples report the use of that glass. Corning Code 8112 glass is well annealed, but has not been subjected to the heat treatment required to induce photochromic behavior in the glass.

Samples taken from lens blanks were ground and polished to a thickness of 2 mm. Those samples were placed in a heat treating chamber and exposed at a temperature of about 480° C. in a stream of hydrogen gas for periods of 1 hour, 2 hours, and 4 hours, respectively. The table below records the values of the chromaticity coordinates (x, y), the luminous transmittance (Yc), and the spectral purity (p) calculated from the values given in the table.

| Time | x | y | Yc | p |
|---|---|---|---|---|
| 1 hour | 0.3855 | 0.4257 | 76.5 | 50% |
| 2 hours | 0.3943 | 0.4361 | 74.5 | 55% |
| 4 hours | 0.4174 | 0.4573 | 68.4 | 67% |

The spectral transmittance data for the one and four hour thermoreduction treatments are reported in FIG. 1. The curve for the example fired for one hour (designated by A) illustrates strong attenuation without total blocking for wavelengths in the vicinity of 400 nm, thereby permitting a small amount of blue transmission. In contrast, near total blocking of wavelengths in the vicinity of 400 nm occurs after an exposure of four hours to the thermoreduction treatment. This is illustrated by a curve designated as Curve B.

From a study of the above examples, it can be seen that, through control of the hydrogen firing time and temperature parameters, the development of integral surface layers can be carefully regulated such that the transmittance of the glass article in the wavelength region neighboring 400 nm can be controlled.

From an economic point of view, the most preferred embodiment of the invention comprises utilizing Corning Code 8112 glass with firing times of less than about 1 hour at about 480° C.

FIG. 1 also shows the transmittance curve (Curve C) for a yellow cadmium sulfoselenide glass marketed by Corning Glass Works at one time under Code No. 3384. A yellow color filter produced from this glass had x and y color coordinate values (Illuminant C) of 0.4632 and 0.5146, respectively. The luminous transmittance (Y) value was 75.1 and color purity was about 95%.

This filter is subject to the undesirable features set forth earlier. In addition, transmittance properties are essentially fixed in the glass, and are not subject to control by heat treatment as illustrated in Curves A and B. However, glasses of this nature may still be employed in an application requiring a relatively sharp cutoff and more complete blocking at lower wavelengths.

What is claimed is:

1. A method for making a non-photochromic silver halide-containing glass article that is adapted to use in the field of optometry, that is essentially free from silver halide crystals, that exhibits a bright yellow coloration that reduces to less than 20% the transmission of ultraviolet radiation and radiation having wavelengths up to about 450 nm, but is transparent to radiation having wavelengths longer than the region of attenuated transmission, said method comprising exposing said article to a hydrogen-containing atmosphere in a heat treating chamber operating at a temperature between about 450°–500° C. for at least about 0.5 hour to produce an integral reduced surface layer on said article having a depth effective to reduce to below 20% the transmission of ultraviolet radiation and radiation having wavelengths up to about 450 nm.

2. A method according to claim 1 wherein said article comprises a silver halide-containing glass consisting essentially, expressed in terms of weight percent, of 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio alkali metal oxide:$B_2O_3$ ranges about 0.55–0.85, and the weight ratio Ag:(Cl+Br) ranges about 0.65–0.95.

3. A method according to claim 2 wherein said silver halide-containing glass also contains up to 10% total of the following components in the indicated proportions selected from the group consisting of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F.

4. A method according to claim 1 wherein said period of time is 0.5–4 hours.

* * * * *